(12) United States Patent
Kurimoto et al.

(10) Patent No.: US 7,670,538 B2
(45) Date of Patent: Mar. 2, 2010

(54) CANNULA CASTING MOULD AND CASTING METHOD

(75) Inventors: Wataru Kurimoto, Fukuroi (JP); Hiromichi Itakura, Fukuroi (JP)

(73) Assignee: Tyco Healthcare Group LP, Mansfield, MA (US)

( * ) Notice: Subject to any disclaimer, the term of this patent is extended or adjusted under 35 U.S.C. 154(b) by 76 days.

(21) Appl. No.: 11/954,740

(22) Filed: Dec. 12, 2007

(65) Prior Publication Data

US 2008/0179792 A1 Jul. 31, 2008

(30) Foreign Application Priority Data

Dec. 15, 2006 (JP) .............................. 2006-337743

(51) Int. Cl.
*B29C 45/00* (2006.01)
*B29C 45/26* (2006.01)

(52) U.S. Cl. .................................. 264/328.11; 425/543

(58) Field of Classification Search ............ 604/165.03; 264/328.11; 425/543
See application file for complete search history.

(56) References Cited

U.S. PATENT DOCUMENTS

| | | | | |
|---|---|---|---|---|
| 4,647,419 A | * | 3/1987 | Helfer et al. ............. | 264/328.9 |
| 5,240,397 A | * | 8/1993 | Fay et al. .................... | 425/145 |
| 5,750,155 A | * | 5/1998 | Eckardt et al. .............. | 425/130 |
| 6,643,909 B2 | * | 11/2003 | Rose ............................ | 29/595 |
| 2004/0169318 A1 | * | 9/2004 | Chiba ....................... | 264/328.1 |
| 2005/0033237 A1 | * | 2/2005 | Fentress et al. ......... | 604/165.03 |
| 2007/0096364 A1 | * | 5/2007 | Hahn et al. ................. | 264/255 |

FOREIGN PATENT DOCUMENTS

| JP | 2002-017856 | * | 1/2002 |
|---|---|---|---|
| JP | 2002017856 A | | 1/2002 |

\* cited by examiner

*Primary Examiner*—Joseph S Del Sole
*Assistant Examiner*—Kimberly A Stewart

(57) ABSTRACT

A cannula casting mould and casting method for improving quality by making it possible to cast a smooth surface. An opening is formed in the side of the front side and a casting mould for casting a cylindrical cannula formed with a liquid flow path that is connected inside to the opening that comprises a mould body in which a casting groove is formed, a core area placed in the casting groove forming a casting open area between the surfaces of the casting groove, and an angle pin prepared in the mould body in an elongated state of the area corresponding to the open area of the casting groove. Furthermore, the injection opening for injecting casting material into the casting opening is prepared on the opposite side of the core area centre of axis from the area where the angle pin was placed in the mould body.

4 Claims, 6 Drawing Sheets

CANNULA CASTING MOULD AND CASTING METHOD

FIELD OF THE INVENTION

The present invention is related to a cannula casting mould and cannula casting method for casting cannulae used for suction of liquid medicine and the like stored in a container such as an ampoule and for supplying the suctioned liquid medicine and the like to a patient via a transfusion line.

BACKGROUND OF THE INVENTION

To date, normal saline water and liquid medicine and the like that are stored in containers such as vials or ampoules are suctioned using a syringe with a cannula attached to the tip, and this liquid medicine and the like is supplied to the patient through filling a prescribed area of a transfusion line connected to the patients body. The tip of this cannula comprises a narrow cylindrical needle, and there is an opening for injection and extraction of liquid medicine and the like formed in the tip of this cylindrical needle. Of the types of cannulae, there are those that are formed out of resin material to enable expanding shape selection width and to ensure safety. Furthermore, there are those where the opening is not prepared in the tip of the needle but in the side area of the tip of the needle (for example Patent reference 1: Published unexamined patent application 2002-17856).

In the case that this type of cannula is cast using injection moulding equipment prepared with a casting mould, a core area that forms the cast open area is placed between surfaces of the groove for casting and in addition, opening forming pins that correspond to the opening of the cannula in the mould body extend towards the core area from both sides and the tip areas contact the core area and in this state, casting material is injected into the casting open area through the injection opening of the mould body. Furthermore, in the case that an opening is not formed on both sides, but only one side of the tip, a pin for preventing inclination due to injection pressure of casting material contacts the tip area of the core on the surface opposite the surface where the opening forming pin in the core area contacts and injection moulding is performed with this condition. In addition, processing treatment to fill the hole cast by the pin for preventing inclination is performed after casting.

However, of the aforementioned conventional cannulae manufactured using a resin, when producing a cannula with an opening formed on one side of the tip area, there was the problem that manufacturing processes increased due to the necessity of processing treatment to close the hole formed by the pin for preventing inclination and in addition there was the possibility that the surface of the cannula would be rough after closing the hole, lowering the quality of the cannula.

Taking these circumstances into consideration, the purpose of the present invention is to provide a casting mould and casting method for cannulae enabling a reduction of manufacturing processes and increasing quality by enabling the forming of a smooth surface.

SUMMARY OF THE INVENTION

In order to achieve the aforementioned purpose, a cannula casting mould corresponding to the present invention comprises a cannula casting mould for casting a cylindrical cannula, formed with an opening on the side of the front end and a continuous liquid flow path that connects to the opening formed inside and prepared with a mould body formed with a groove for casting, a core area placed in the groove for casting with the casting open area for casting a cannula formed in between the surfaces of the groove for casting, and an opening forming pin that extends from the area that corresponds to the opening of the cannula in the mould body towards the core area and where the injection opening for injecting casting material into the open area for casting is placed on the opposite side of the core centre axis from the pin for casting an opening in the mould body.

Furthermore, a cannula casting method corresponding to the present invention comprises a cannula casting method where an opening is formed on the side of the front end and that a continuous flow path that is connected to said opening is cast inside the cylindrical cannula; and this is prepared with a core area placement step where, in addition, to a groove for casting being formed, a core for forming an open area for casting a cannula between the surfaces of the groove for casting is placed in the mould body where an opening forming pin is placed in an area corresponding to the opening of the cannula and a casting material injection process for injecting casting material into the open area for casting through the injection opening prepared in an area placed opposite the core area centre of axis from the opening forming pin set in the mould body.

DESCRIPTION OF FIGURE NOTATIONS

Figure 1:
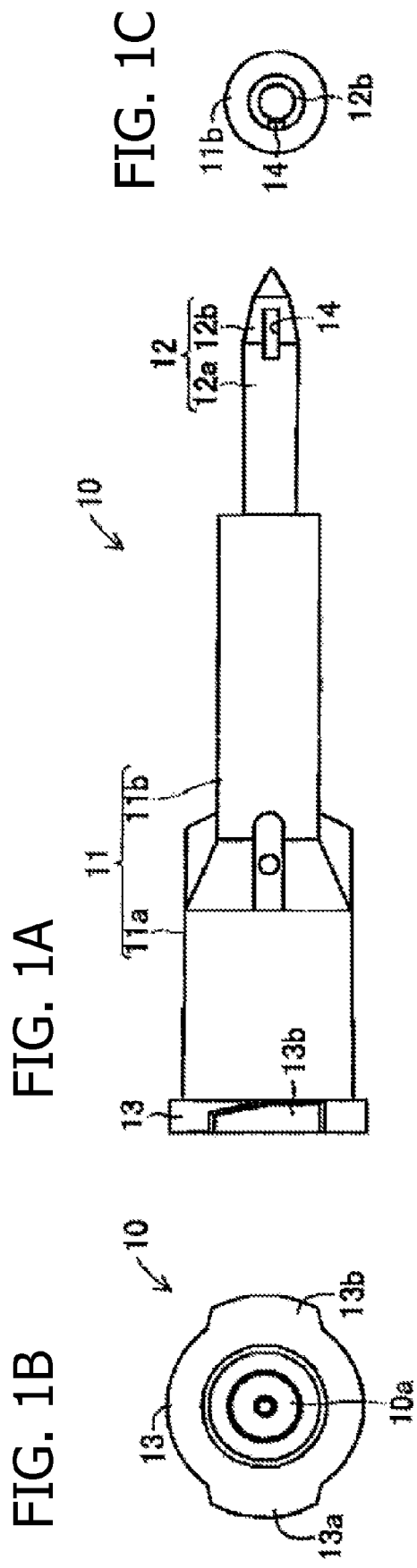
FIG. 1 shows a cannula cast based on embodiment 1 of the present invention where (a) is a side view drawing, (b) is a rear view drawing, and (c) is a plan view drawing that show the puncture area of the cannula.

10. Cannula
10a. Liquid flow path
11. Cannula body
12. Puncture area
14. Opening
20. Casting mould
21. Mould body
22. Core area
23. Angle pin
24. Casting groove
25b. Injection opening

DETAILED DESCRIPTION OF THE INVENTION

Figure 2:
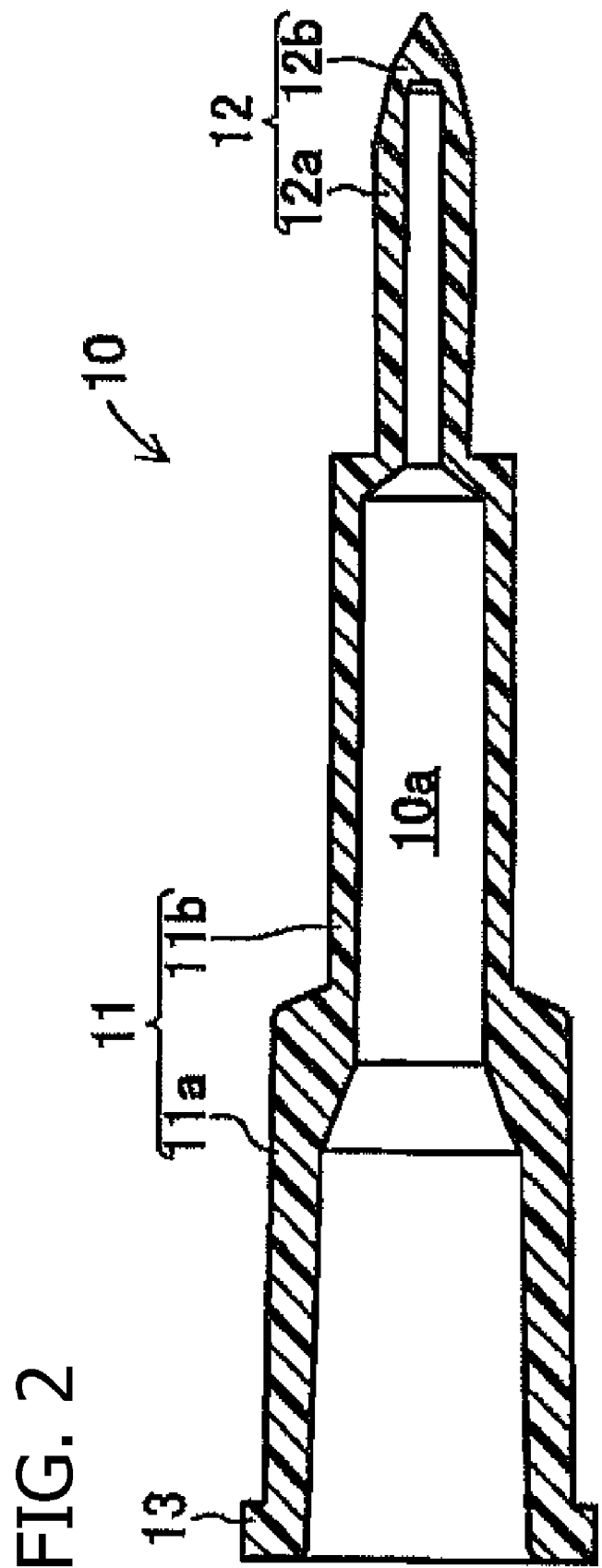
FIG. 2 is a cross sectional drawing of the cannula.

A cannula casting mould and casting method corresponding to one embodiment of the present invention is described below using the drawings. FIG. 1 and FIG. 2 show a cannula 10 formed in this embodiment. The cannula 10 comprises a cannula body 11 and narrow cylindrical puncture area 12 formed on the front end of cannula body 11 constructed of cylinders of different sizes. Furthermore, a liquid flow path 10a is formed along the different sizes of the centre axis of the cannula 10 for passage of liquid such as liquid medicine inside the cannula 10.

The cannula body 11 comprises a large diameter connection area 11a on the base end for connecting to syringes and the like (not shown) and a junction area 11b with a smaller diameter than the connection area 11a formed between the connection area 11a and the puncture area 12. Furthermore, there is a flange shaped step area 13 formed at the back end of the connection area 11a and threaded areas 13a and 13b are formed on protrusions that are on both sides of the outer circumference surface. Furthermore, the area located in the connection area 11a of the liquid flow path 10a is formed in a taper shape with a diameter that gradually gets smaller from the base area to the front area and the area located in the junction area 11b is formed with the same diameter from the back end side (base end side) to the front end.

Furthermore, a taper shaped area where the diameter gradually gets smaller from the back end to the front end is formed between the front area of an area located in the connection area 11a of the liquid flow path 10a and an area located in the junction area 11b. The puncture area 12 comprises a cylindrical narrow area 12a formed with a taper shaped external diameter that gets slightly larger from the back to the front and an internal diameter that is basically the same from the back end to the front end and a sharp area 12b comprising a two staged taper area where the front end gradually becomes narrow formed on the front end of the cylindrical narrow area 12a.

This sharp area 12b has the front end closed and is formed with a sharp point. Furthermore, there is an elongated rectangular opening 14 formed along the axis direction of the puncture area 12 from the front area of the cylindrical narrow diameter area 12a on the outer circumference of the puncture area 12 to the back end of the sharp area 12b. This opening 14 is connected to the liquid flow path 10a and, for example, the cannula 10 is mounted on the front end of a syringe and through operation of the syringe, liquid to be injected is discharged into the liquid flow path 10a from the syringe or liquid is suctioned from outside and sent to the syringe from the liquid flow path 10a.

Figure 3:
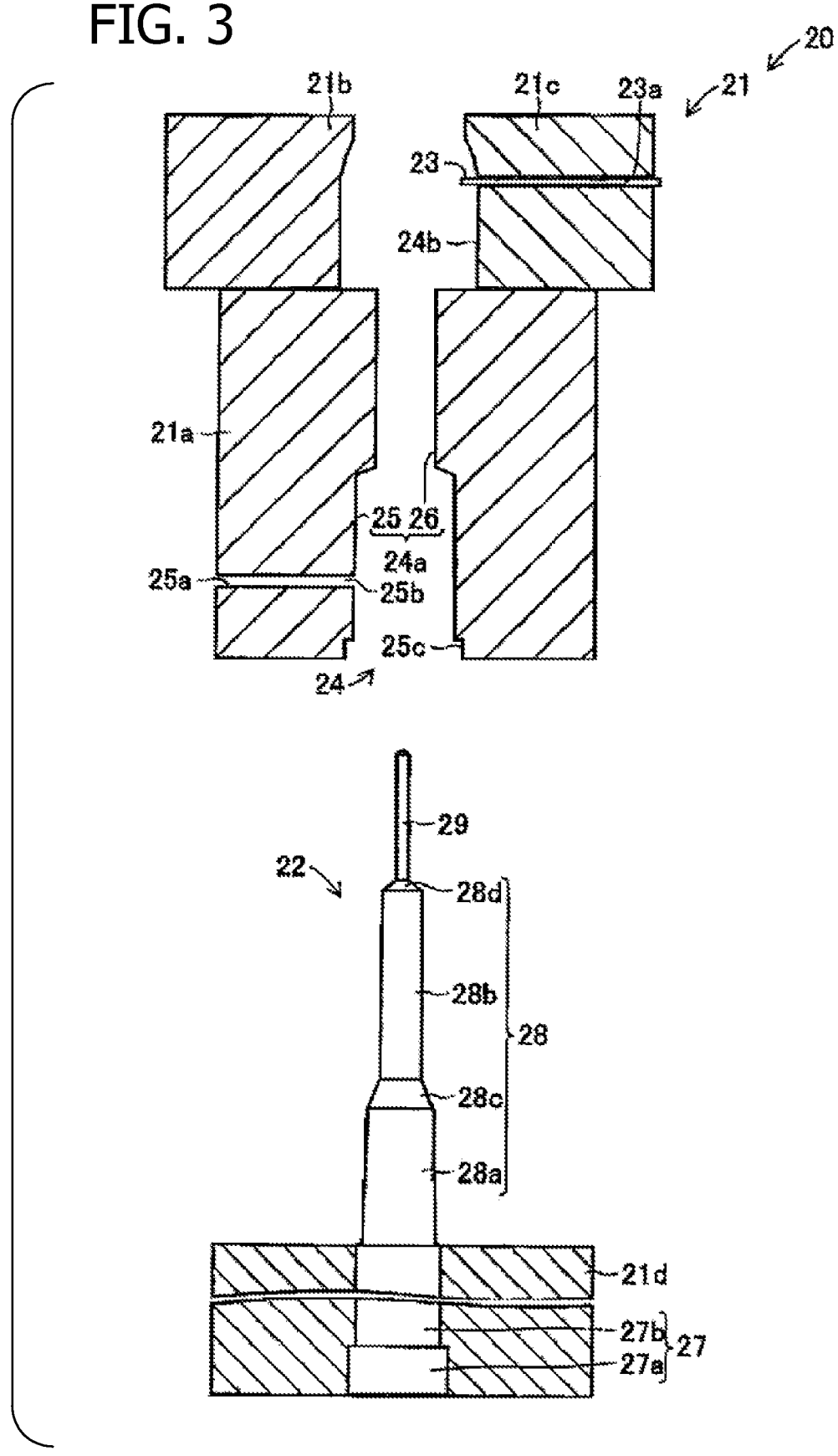
FIG. 3 is a cross sectional drawing that shows the status with each mould that forms the casting mould open.
Figure 4:
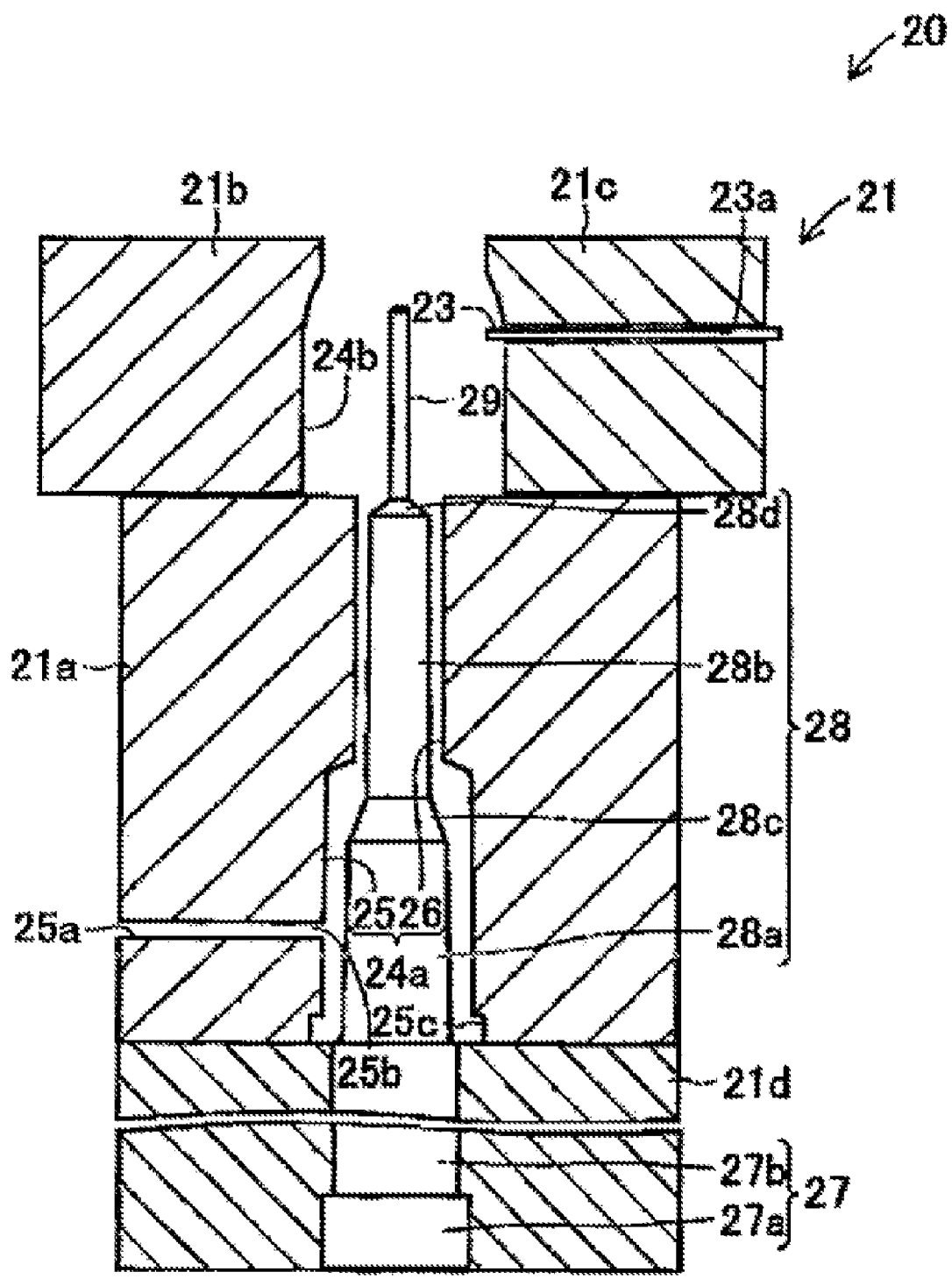
FIG. 4 is a cross sectional diagram that shows the moveable mould attached to the core area from the state of FIG. 3 mated to the stationary mould.
Figure 5:
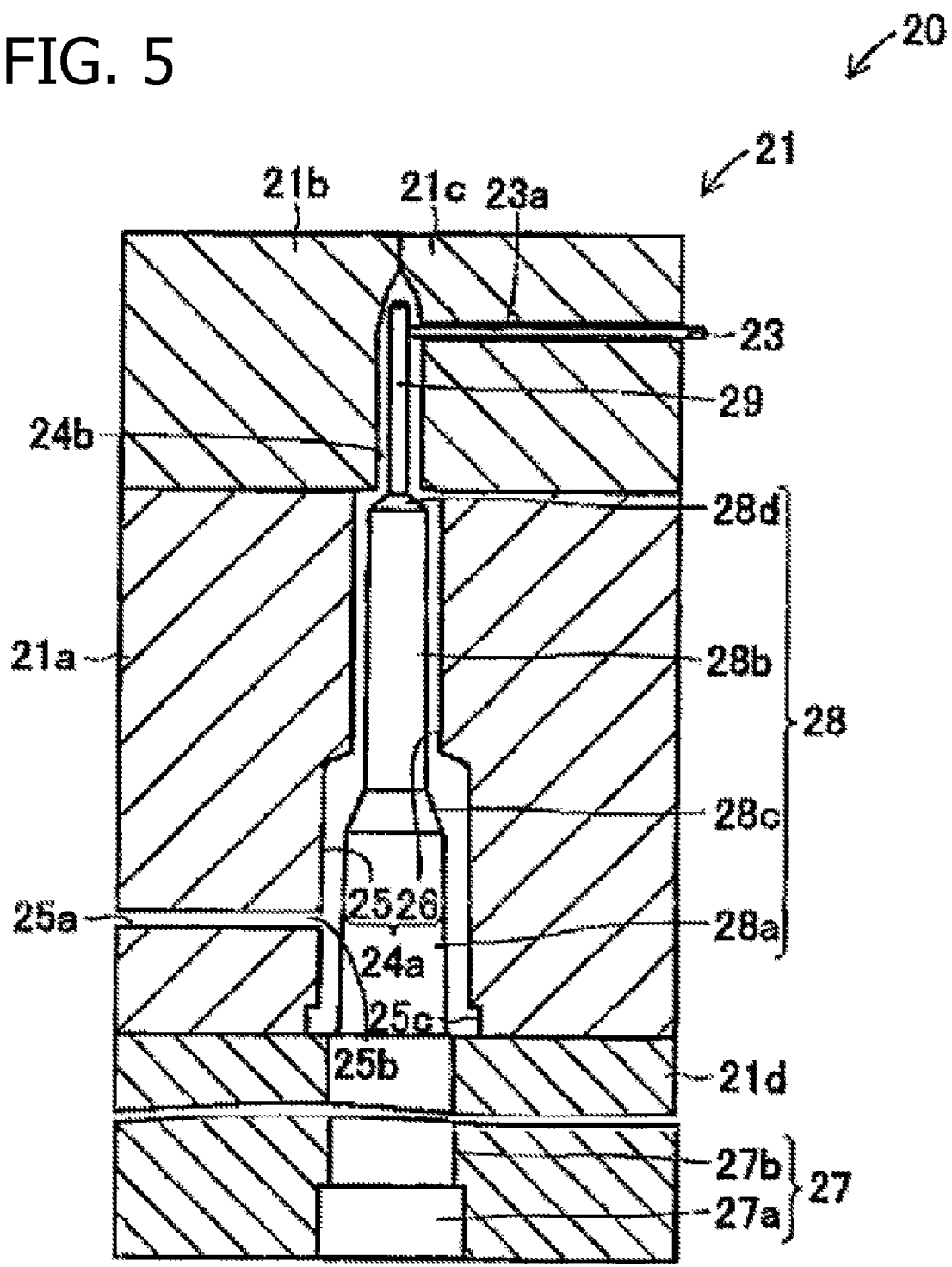
FIG. 5 is a cross sectional drawing that shows the status with each mould that forms the casting mould closed.

The cannula 10 constructed in this manner is formed out of a thermoplastic resin such as polypropylene for constructing a cast product and is cast using the casting mould shown in FIG. 3 through FIG. 5. This casting mould 20 is prepared with a mould body 21, core area 22, and an angle pin 23 as the opening forming pin of the present invention fixed in a prescribed area of the mould body 21. The mould body 21 comprises four moulds, a stationary mould 21a located in the centre of FIG. 3 through FIG. 5, a pair of moveable moulds 21b and 21c that can move back and forth parallel to the stationary mould 21a based on the operation of mould moving equipment (not shown) placed above the stationary mould 21a and a moveable mould 21d below the stationary mould 21a and onto which the core area 22 is mounted.

Furthermore, a casting groove 24 that has roughly the same external shape as the cannula 10 is formed in each of the moulds with the moveable mould 21d removed from the mating surface of the stationary mould 21a and the moveable moulds 21b and 21c and the mating surface of the stationary mould 21a and the moveable mould 21d. Incidentally, FIG. 3 through FIG. 5 show a condition of viewing the casting mould 20 from above, below, for convenience, the stationary mould 21d will be described from below and the moveable moulds 21b and 21c will be described from above. In addition, the surface (internal surface) of the groove for casting comprises a body external surface moulding area 24a corresponding to the outer surface of the cannula body 11 and a penetration area external surface forming area 24b corresponding to the external surface of the penetrating area 12.

Figure 7:
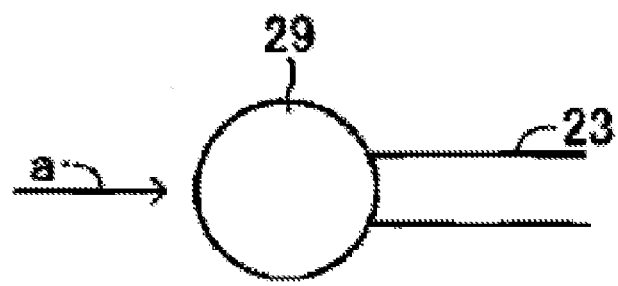
FIG. 7 is an illustration drawing that shows the core area in FIG. 5 viewed from above.

Furthermore, there is a pin insertion hole 23a extending roughly orthogonally to the casting groove 24 axis from the external surface of the moveable mould 21c in the top area of the penetration area external surface forming area 24b of the moveable mould 21c of the mould body 21 that is open and the angle pin 23 is set inside this pin insertion hole 23a such that the front end protrudes into the penetration area external surface forming area 24b. This angle pin 23 comprises a rod that has a cross sectional shape formed the same as the opening 14. Furthermore, as shown in FIG. 7 in the vertical direction (front to back direction of FIG. 3 through FIG. 5) the front end surface of the angle pin 23 is formed with a curved surface to become depressed in the centre area and this enables contact with nearly the entire surface of the circumference of the penetration internal surface forming area 29 of the core area 22 described below.

Incidentally, there is a gap prepared between the angle pin 23 and the pin insertion hole 23a to discharge air from inside the groove for casting during injection and moulding to the outside of the casting mould 20, and the angle pin 23 is fixed on the outside of the moveable mould 21c. Furthermore, the body outer surface forming area 24a comprises a connection area outer surface forming area 25 that corresponds to the outer surface of the connection area 11a of the cannula body 11 and a junction area outer surface forming area 26 that corresponds to the outer surface of the junction area 11b.

Furthermore, the front end of the material flow path 25 that extends from the outer surface of the stationary mould 21a opens into an area that is opposite the pin insertion hole 23a in which the angle pin 23 is placed from the casting groove 24 of the connection outer surface forming area 25, and this opening makes up the injection opening 25b. In addition, a large diameter area 25c that corresponds to the outer surface of the step area 13 and threaded areas 13a and 13b of the cannula 10 are formed in the opening of the mould body 21 of the connecting area outer surface forming area 25. Incidentally, the direction that the material flow path 25a extends and the direction that the angle pin 23 extends in the axial rotational direction of the casting groove 24 is within an angle of 180±2 degrees.

The core area 22 can move back and forth in the casting groove 24 of the stationary mould 21a and the moveable moulds 21b and 21c through movement of the moveable mould 21d. This core area 22 is a member that forms the inner surface of the cannula 10 that when inserted in the casting groove 24, is formed in a shape that can form an open area with nearly the same thickness as the thickness of the cannula 10 between the surfaces of the casting groove 24. In other words, the core area 22 comprises a core body 27 that is made up of a two step circular area, a body internal surface forming area 28 made up of a four step roughly cylindrical area corresponding to the inner surface of the cannula body 11 and a puncture area internal surface forming area 29 that corresponds to the inner surface of the penetration area 12.

The core body 27 of the core area 22 comprises a base area 27a that has a large diameter and a short length in the axial direction and an extend area 27b that has a smaller diameter than the base area 27a that extends upward from the base area 27a and has a long length in the axial direction and is fixed to the moveable mould 21d. Furthermore, the moveable mould 21d is joined to the core moving device (not shown) that moves the core 22 back and forth with respect to the stationary mould 21a and the casting groove 24 of the moveable moulds 21b, 21c. Furthermore, the body internal surface forming area 28 comprises a connection internal surface forming area 28a that corresponds to the internal surface of the connection area 11a of the cannula 11, a junction area internal surface forming area 28b that corresponds to the internal surface of the junction area 11b, a taper area 28c that is formed between the connection area internal surface forming area 28a and the junction area internal surface forming area 28b, and a taper area 28d formed on the front end of the junction area internal surface forming area 28b.

The connection area internal surface forming area 28a comprises a taper shaped cylindrical body where the front end is slightly narrower than the base end and the junction area internal surface forming area 28b comprises a cylindrical body that has a smaller diameter than the connection area internal surface forming area 28a and that has roughly the same diameter from the base area to the front area. Furthermore, the base end area of the taper area 28c has the same diameter as the front end of the connection area internal surface forming area 28a and the front end area of the taper area 28c has the same diameter as the junction area internal surface forming area 28b and the taper area 28c is formed in a circular cone shape. Furthermore, the puncture internal surface forming area 29 is connected to the junction internal surface forming area 28b via the taper area 28d and is formed with a cylindrical shape with a diameter narrower than that of the junction internal surface forming area 28b.

Furthermore, the base area of the taper area 28d has the same diameter as the front area of the junction area internal surface forming area 28b and the front end of the taper area 28d has the same diameter as the puncture area internal surface forming area 29 and the taper area 28d is formed in a circular cone shape. Incidentally, while not shown, the casting mould 20 is prepared with a cooling water path to cool prescribed areas of the mould body 21 and the injection mould equipment that this casting mould 20 is mounted on is prepared with a plunger for pushing the casting material into the casting groove 24, control equipment and the like for controlling each device prepared surrounding the casting mould 20 and all the equipment and mechanisms needed to performing casting using the casting mould 20.

When using a casting mould 20 constructed in this manner for casting a cannula 10, first, with the casting mould 20 in an opened state as shown in FIG. 3, the core movement equipment is operated and by moving the movable mould 21d, the core area 22 is inserted into the body outer surface casting area 24a of the stationary mould 21a. This enables moving to the state shown in FIG. 4. In addition, the mating surfaces of the moveable moulds 21b and 21c are connected by operating the mould moving device from this state. This enables contact of the angle pin 23 curved surface with the circumferential surface of the penetration area internal surface forming area 29. Furthermore, as shown in FIG. 5, the casting mould 20 forms an area that has roughly the same shape as the cannula 10 (same shape if shrinkage of the cast material is not considered) between the surface of the casting groove 24 of the mould body 21 and the body internal surface casting area 28 of the core area 22 and external circumferential surface of the puncture area internal surface forming area 29.

Figure 6:
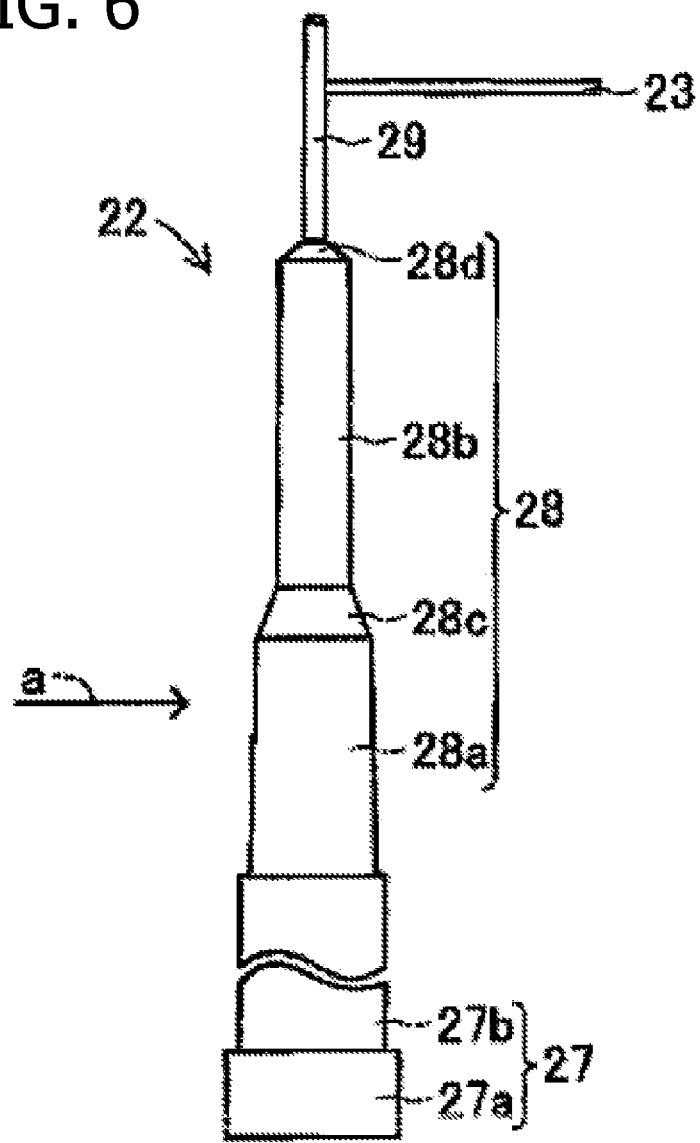
FIG. 6 is an illustration drawing that shows the pressure that is applied to the core area when casting material is injected into the casting groove area.

In this case, as the body internal surface casting area 28 of the core area 22 and the external circumferential surface of the puncture area internal surface forming area 29 only contact the front end surface of the angle pin 23, the front end side area of the core 22 can swing in any direction other than the direction where the angle pin 23 is located. In this condition, casting material is injected into the casting groove area of the mould body 21 via the injection opening 25b from the material flow path 25a and fills the open area between the surface of the casting groove area 24 and the external circumferential surface of the core area 22. Here, as shown in FIG. 6 and FIG. 7, pressure is applied on the core area 22 in the direction shown by the arrow a by flow of the casting material.

Therefore, there is a force applied on the front area of the core area 22 causing inclination in the right direction but as the circumferential surface of the puncture area internal surface forming area 29 contacts the front surface of the angle pin 23, inclination of the core area 22 is prevented. Therefore, the area between the body internal surface forming area 28 of the core 22 as well as the external surface of the puncture area internal surface forming area 29 and the surface of the casting groove area 24 of the mould body 21 maintain a suitable shape that is roughly the same as the cannula 10. Furthermore, after the casting material hardens through cooling, the mould moving equipment is operated and the moveable moulds 21b and 21c are both separated and aligned above the stationary mould 21a, opening up the mould.

Also, the core moving equipment is operated and the core 22 is moved and withdrawn together with the moveable mould 21d. Here, the cast product cast in the casting groove area 24 is pulled out of the stationary mould 21a together with the core area 22. Next, the cast product pulled from the stationary mould 21a together with the core area 22 is removed from the core area 22. This removal is performed by a robot (not shown). Furthermore, unnecessary areas such as runners and the like are removed from the cast product pulled out of the core area to enable obtaining the cannula shown in FIG. 1 and FIG. 2.

This cannula 10, for example, can be mounted on the front end of a syringe and in the case of suctioning liquid medicine that is in an ampoule, the liquid medicine that is suctioned into the syringe can be used for supplying to a branch pipe where a valve disk made of rubber of a three way stopcock is prepared on a transfusion line connected to the body of a patient. In the case that the liquid medicine that is suctioned into a syringe is supplied to a branch pipe, with the puncture area 12 of the cannula 10 inserted into the valve disc, the liquid is injected into the branch pipe of the three way stopcock through operation of the syringe. In this case, as the narrow cylindrical area 12a of the puncture area 12 is formed with a taper shape where the front end becomes larger, the restoration force of the valve disc prevents withdrawal and disengaging of the puncture area 12 from the valve disc.

Furthermore, in addition the sharp area 12b of the puncture area 12 is formed in two steps, as the opening 14 is formed in the side of the puncture area 12, when the puncture area 12 is inserted into the valve disc, the valve disc is not cut and removed by the sharp area 12b of the puncture area 12 or the edge of the opening 14. It follows that broken pieces cut and removed from the valve disc are not sent into the body of the patient with the liquid medicine and the liquid medicine is maintained in a suitable condition for being supplied into the body of the patient.

In this manner, with the casting mould for a cannula corresponding to the present invention, an injection opening 25 for injection casting material into the casting groove 24 of the mould body 21 is prepared in the stationary mould 21a and the angle pin 23 is prepared in the pin insertion hole 23a formed in the moveable mould 21c located on the opposite side of the injection opening 25b from the casting groove 24. Furthermore, with the front surface of the angle pin 23 contacting the puncture area internal surface forming area 29 of the core 22, casting material is injected into the casting groove 24.

Therefore, the casting material that is injected into the casting groove 24 fills, from the injection opening 25, the entire open area between the surface of the casting groove 24 and the external circumferential surface of the core 22 in such a manner as to push the puncture internal surface forming area 29 of the core area 22 against the angle pin 23. As a result, a cannula 10 prepared with a single opening 14 can be accurately manufactured. Furthermore, as the injection opening 25 is prepared below the stationary mould 21a, there are no marks of the injection opening that are left on the puncture area 12 of the cast cannula 10. Therefore, there is no real after-processing and other than the opening 14 of the puncture area 12, a smooth surface can be formed.

Furthermore, using the cannula casting method corresponding to the present invention enables reduction of manufacturing processes, as the process for filling the hole formed by a pin for preventing inclination is not needed, because the pin for preventing inclination of the core 22 is not used when injecting cast material into the groove area. In addition, roughness that remains as marks of the closed hole on the surface of the cannula also no longer occurs.

Furthermore, the cannula casting mould and casting method corresponding to the present invention is not restricted to the embodiment described above and within technical limits the present invention can be suitably modified. For example, in the aforementioned embodiment, the narrow cylindrical area 12a of the puncture area 12 of the cannula 10 and the external form of the puncture area 12 of the mould body 21 are formed with the front area formed in a taper shape with a large diameter and comprise two moveable moulds 21b and 21c, but the narrow cylindrical area 12a can be formed with a taper shape where the front end becomes narrow or with a uniform diameter cylinder and one moveable mould may be used in place of the moveable moulds 21b and 21c.

In this case, the angle pin 23 can move back and forth with respect to the casting groove area 24 through operation of the moving device. Furthermore, based on this, not only the moveable moulds 21b and 21c but also the stationary mould 21a and moveable moulds 21b and 21c could all be constructed using a single mould. In addition, in the aforementioned embodiment, the opening 14 was formed in a rectangular shape, but this shape is not limited to rectangles and the shape can be a circle or a triangle or the like.

The cannula casting mould corresponding to the present invention constructed as described above is for casting a cannula with an opening for injection and extraction of liquid medicine and the like formed in only one side of the front end and in which the area where a pin for preventing inclination would be placed is an open area, no pin is placed in the area on the opposite side of the opening forming pin placed to form an opening in the front end of the cannula in the groove area for moulding of the mould body. Furthermore, the injection opening for injection casting material into the opening for casting is prepared in an area placed on the opposite side of the core from the area where the opening forming pin of the mould body is placed.

Therefore, the casting material injected into the opening for casting fills all of the opening for casting in a manner pushing the core area from the injection opening towards the opening forming pin. As a result, inclination of the core area can be prevented by the injection pressure of the casting material, even if a pin for preventing inclination is not used, and a cannula with favourable dimensional accuracy can be obtained. Furthermore, in addition to the processing treatment for closing the hole formed in the case of using a pin for preventing inclination no longer being needed, the roughness of the surface of the area where this processing treatment was performed on the cannula no longer occurs.

Incidentally, the opening forming pin can be fixed in place in the prescribed area of the mould body in this case or one that can move back and forth in a pin insertion hole in the mould body with respect to the core area can be used. In the case that the opening pin is fixed in place, prepare at least the area in which the opening pin is fixed in the mould body to be able to move with respect to the remainder of the mould body so that when the area in which the opening pin is fixed in the mould body is moved and removed from the remainder of the mould body, the opening pin is pulled out of the opening in the cannula cast by the opening pin. This enables removal from the remainder of the mould body of the cast cannula.

Furthermore, another construction characteristic of the cannula casting mould of the present invention is a puncture area comprising a cannula, cannula body, and opening formed in the tip of the cannula body and, in addition, the open area for casting comprising a body forming area corresponding to the cannula body and a puncture area forming area corresponding to the puncture area, and an injection opening prepared in an area corresponding to a body forming area of the mould body. As marks of the injection opening are not left on the cannula puncture area, after-treatment for smoothing the surface of the puncture area is no longer required. Furthermore, the surface other than the opening for the puncture area can be formed with a smooth surface, increasing the puncture capability of the puncture area.

Furthermore, a characteristic of the structure of the cannula casting method corresponding to the present invention is a cannula casting method where an opening is formed on the side of the front end and that a continuous flow path that is connected to said opening is cast inside the cylindrical cannula; and this is prepared with a core area placement step where, in addition, to a groove for casting being formed, a core for forming an open area for casting a cannula between the surfaces of the groove for casting is placed in the mould body where an opening forming pin is placed in an area corresponding to the opening of the cannula and a casting material injection process for injecting casting material into the open area for casting through the injection opening prepared in an area placed opposite the core area centre of axis from the opening forming pin set in the mould body.

The cannula casting method structure in this manner is prepared with a core placement step for setting a core inside the a mould body with an opening forming pin placed in an area corresponding to the cannula opening in the mould and a casting material injection step for injection of casting material into the open area for casting through the injection opening. Furthermore, in the core placement step, the prescribed area of the core area is caused to contact or to come into close proximity with the opening forming pin that extends from an area corresponding to the cannula opening in the mould body and in the casting material injection step, casting material is injected through the injection opening prepared in an area opposite the area where the opening forming pin is placed in the mould body.

Therefore, casting material injected into the opening for casting fills all of the opening for casting in a manner that pushes the core area against the opening forming pin side and the core area is not inclined and a cannula prepared with one opening can be accurately cast. Furthermore, as a pin for preventing inclination is not used, the process for closing the hole formed in the case of using a pin for preventing inclination is no longer required and manufacturing processes can be reduced. In addition, roughness that remains as marks of the closed hole on the surface of the cannula also no longer occurs.

Incidentally, the opening forming pin can be fixed in place in the prescribed area of the mould body in this case, or one that can move back and forth in a pin insertion hole in the mould body with respect to the core area can be used. In the case that the opening pin is fixed in place, prepare at least the area in which the opening pin is fixed in the mould body to be able to move with respect to the remainder of the mould body so that when the area in which the opening pin is fixed in the mould body is moved and removed from the remainder of the mould body, the opening pin is pulled out of the opening in the cannula cast by the opening pin. This enables removal of the cast cannula from the remainder of the mould body.

Furthermore, in the case that the opening forming pin can be moved back and forth with respect to the core, the core setting step is divided into two steps, a step for setting the core inside the mould body and a step for placing the opening forming pin in the area corresponding to the cannula opening in the mould body. In addition, in the step for placing the opening forming pin, the opening forming pin is extended towards the core area from the area that corresponds to the cannula opening in the mould body and the tip contacts or comes into close proximity with the surface of the core.

Furthermore, another construction characteristic of the cannula casting method corresponding to the present invention is a puncture area comprising a cannula, cannula body, and an opening formed in the tip of the cannula body and in addition, the open area for casting comprising a body forming area corresponding to the cannula body and a puncture area forming area corresponding to the puncture area, and injection of casting material in the casting material injection step is performed through the injection opening prepared in an area corresponding to a body forming area in the mould body. As the marks of the injection opening are not left on the cannula puncture area, after-treatment for smoothing the surface of the puncture area is no longer required. Furthermore, the surface other than the opening for the puncture area can be formed with a smooth surface, increasing the puncture capability of the puncture area.

What is claimed is:

1. A cannula casting mould for casting cylindrical cannulae with an opening formed on one side of the front end and a continuous liquid flow path that communicates with said opening formed inside, wherein the cannula casting mould is prepared with a mould body formed with a groove for casting, a core area placed in said groove for casting with a casting open area for forming said cannula formed between the surfaces of said groove for casting, and a pin for forming an opening that extends from an area corresponding to said cannula opening in said mould body to said core area, and an injection opening for injecting casting material into said open area for casting prepared on the opposite side of said core area centre of axis from the area where said opening forming pin in said mould body is placed.

2. The cannula casting mould according to claim 1, wherein the casting mould comprises a puncture area prepared with said cannula, cannula body, and said opening formed in the tip of said cannula said opening for casting comprises an area for forming the body corresponding to said cannula body and an area for forming a penetrating area corresponding to said penetrating area; and said injection opening is prepared in the area corresponding to the area for forming a unit in said mould body.

3. A cannula casting method for casting cylindrical cannulae, with an opening formed on one side of the front end and a continuous liquid flow path that communicates with said opening formed inside, wherein the cannula casting method is prepared with a core area placement step, where, in addition to a groove area for casting being formed, a core area that forms a casting open area for casting said cannula between the surfaces of said groove for casting is placed in the mould body, in which a opening fanning pin is placed in the area corresponding to the opening of said cannula, and a casting material injection step that injects casting material into said casting open area through the injection opening prepared in the area placed on the opposite side of said core area centre of axis from the area where the pin for casting said opening is placed in said mould body.

4. The cannula casting method according to claim 3 that comprises a puncture area prepared with said cannula, cannula body, and said opening formed in the tip of said cannula; said opening for casting comprises an area for forming the body corresponding to said cannula body and an area for forming the penetrating area corresponding to said penetrating area; and said injection of casting material in said cast material injection step is performed through the injection opening prepared in the area that corresponds to the body cast area of said mould body.

* * * * *